(12) United States Patent
Prabhu et al.

(10) Patent No.: US 6,298,069 B1
(45) Date of Patent: Oct. 2, 2001

(54) SYSTEM AND METHOD FOR IMPLEMENTING SELF-DEVICE CONTROL MODULES IN AN ELECTRONIC NETWORK

(75) Inventors: Amal L. Prabhu, Santa Clara; Raymond L. Jensen, Jr., Sunnyvale, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/410,488

(22) Filed: Sep. 30, 1999

(51) Int. Cl.[7] .................................................. H04L 12/26
(52) U.S. Cl. .............................................. 370/463; 370/466
(58) Field of Search .................................. 370/463, 465, 370/466, 467

(56) References Cited

U.S. PATENT DOCUMENTS

| | | | |
|---|---|---|---|
| 5,875,349 | * | 2/1999 | Cornaby et al. ............... 395/825 |
| 6,032,202 | * | 2/2000 | Lea et al. ........................... 710/8 |
| 6,098,138 | * | 8/2000 | Martinelli et al. ............. 710/129 |
| 6,101,566 | * | 8/2000 | Woods et al. ................... 710/129 |

OTHER PUBLICATIONS

Copyright 1997, 1998 by Grundig, Hitachi, Matsushita, Philips, Sharp, Sony, Thomson and Toshiba; The HAVi Architecture, Specification of the Home Audio/Video Interoperability (HAVi) Architecture; version 0.8, Draft May 11, 1998; pp. 1–209.

* cited by examiner

Primary Examiner—Melvin Marcelo
(74) Attorney, Agent, or Firm—Gregory J. Koerner; Simon & Koerner LLP

(57) ABSTRACT

A system and method for implementing self-device control modules in an electronic network comprises a first device that transmits an event communication to a second device across the electronic network in accordance with a first communications protocol. A self-device control module in a local set of network software on the second device responsively accesses and converts the received event communication into a translated communication that complies with a second communications protocol which is compatible with the local set of network software on the second device. In accordance with the present invention, the self-device control module also may provide the translated communication to sets of remote network software across the electronic network.

42 Claims, 8 Drawing Sheets

SYSTEM AND METHOD FOR IMPLEMENTING SELF-DEVICE CONTROL MODULES IN AN ELECTRONIC NETWORK

CROSS-REFERENCE TO RELATED APPLICATIONS

This application relates to co-pending U.S. patent application Ser. No. 09/257,344, entitled "System And Method For Implementing Active Registries In An Electronic Network," filed on Feb. 25, 1999, which is hereby incorporated by reference. The foregoing cross-referenced applications are commonly assigned.

BACKGROUND OF THE INVENTION

1. Field of the Invention

This invention relates generally to electronic networks, and relates more particularly to a system and method for implementing self-device control modules in an electronic network.

2. Description of the Background Art

Implementing an effective method for managing communications between electronic devices within an electronic network is a significant consideration for manufacturers and designers of contemporary electronic systems. An electronic device in a distributed electronic network may advantageously communicate with other remote electronic devices in the network to share and substantially increase the resources available to individual devices in the network. For example, an electronic network may be implemented in a user's home to enable flexible and beneficial sharing of resources between various consumer electronic devices, such as personal computers, digital video disk devices, digital set-top boxes for digital broadcasting, television sets, and audio playback systems.

Managing communications in a network of electronic devices may create substantial challenges for designers of electronic networks. For example, enhanced demands for increased functionality and performance may require more system processing power and require additional hardware resources across the network. An increase in processing or hardware requirements may also result in a corresponding detrimental economic impact due to increased production costs and operational inefficiencies.

Network size is also a factor that affects the management of communications in an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to communicate with various remote software elements on remote devices across the electronic network. However, successfully managing a substantial number of electronic devices across a single network may provide significant benefits to a system user.

In certain instances, network communications between different types of devices may be accomplished using multiple communication protocols or specifications. For example, a recently-manufactured device may employ an new communication protocol that was unavailable when other older network devices were designed. In addition, individual manufacturers may utilize different communication protocols, depending on various design and marketing considerations. In cases where multiple communication protocols are utilized within a single electronic network, the network devices may benefit from efficient network messaging techniques.

Therefore, for all the foregoing reasons, implementing an efficient method for managing communications between electronic devices in a distributed electronic network remains a significant consideration for designers, manufacturers, and users of electronic systems.

SUMMARY OF THE INVENTION

In accordance with the present invention, a system and method are disclosed for implementing self-device control modules in an electronic network. In one embodiment of the invention, initially, an event occurs in a type B device on the electronic network. The type B device may preferably be implemented as a base device or a legacy device that utilizes a type B communications protocol. The foregoing event may include an occurrence of any relevant type or description in the type B device or on the electronic network.

In response to the foregoing event, the type B device may preferably transmit a type B communication to a type A device on the electronic network. The type A device is preferably implemented as a full device or an intermediate device that includes a set of local network software which is compatible with a type A communications protocol. The foregoing type B communication may preferably relate in some manner to the event that previously occurred on the electronic network.

In accordance with the present invention, a self-device control module (self-DCM) in the network software of the type A device preferably accesses the received type B communication, and then advantageously translates the type B communication into a type A communication that may be understood by network software of the type A device.

In one embodiment, a driver interface in the self-DCM preferably functions as an effective interface to a device driver of the type A device for receiving and handling information (such as the type B communication) sent to the device driver from other devices on the electronic network. A command processor then preferably may access the information received by driver interface, and responsively utilize a handler mechanism that determines how to successfully process or interpret the received information.

Next, a translator may preferably convert the received information into translated information that is configured in a network software format (type A) which is compatible with the protocol and specifications of various sets of network software on devices across the electronic network. Finally, a network software interface may provide the translated information that has been converted into the network software format to network software on the type A device.

The self-DCM may preferably also post the translated type A communication to an event manager in network software of the type A device. The self-DCM preferably posts the translated type A communications as a network event. The event manager may preferably then notify any interested devices or software modules that have subscribed for notification regarding the particular network event represented by the type B communication. In accordance with the present invention, remote sets of network software residing on respective remote devices preferably may subscribe for notification whenever the self-DCM receives a type B communication.

Finally, the subscribers may react to the notification from the event manager in any appropriate manner, depending upon the type of event and the type of subscribing device or software module. The invention is discussed here in the context of a single self-DCM. However, the present invention is also contemplated for use with multiple self-DCMs residing on respective network devices across the electronic network. The present invention thus provides a system and method to efficiently implement self-device control modules across an electronic network.

DETAILED DESCRIPTION OF THE PREFERRED EMBODIMENT

The present invention relates to an improvement in electronic network technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for implementing self-device control modules in an electronic network, and preferably includes a first device that transmits an event communication to a second device across the electronic network in accordance with a first communications protocol. A self-device control module in a local set of network software on the second device responsively accesses and converts the received event communication into a translated communication that complies with a second communications protocol which is compatible with the local set of network software on the second device. In accordance with the present invention, the self-device control module also may provide the translated communication to sets of remote network software across the electronic network.

Figure 1:
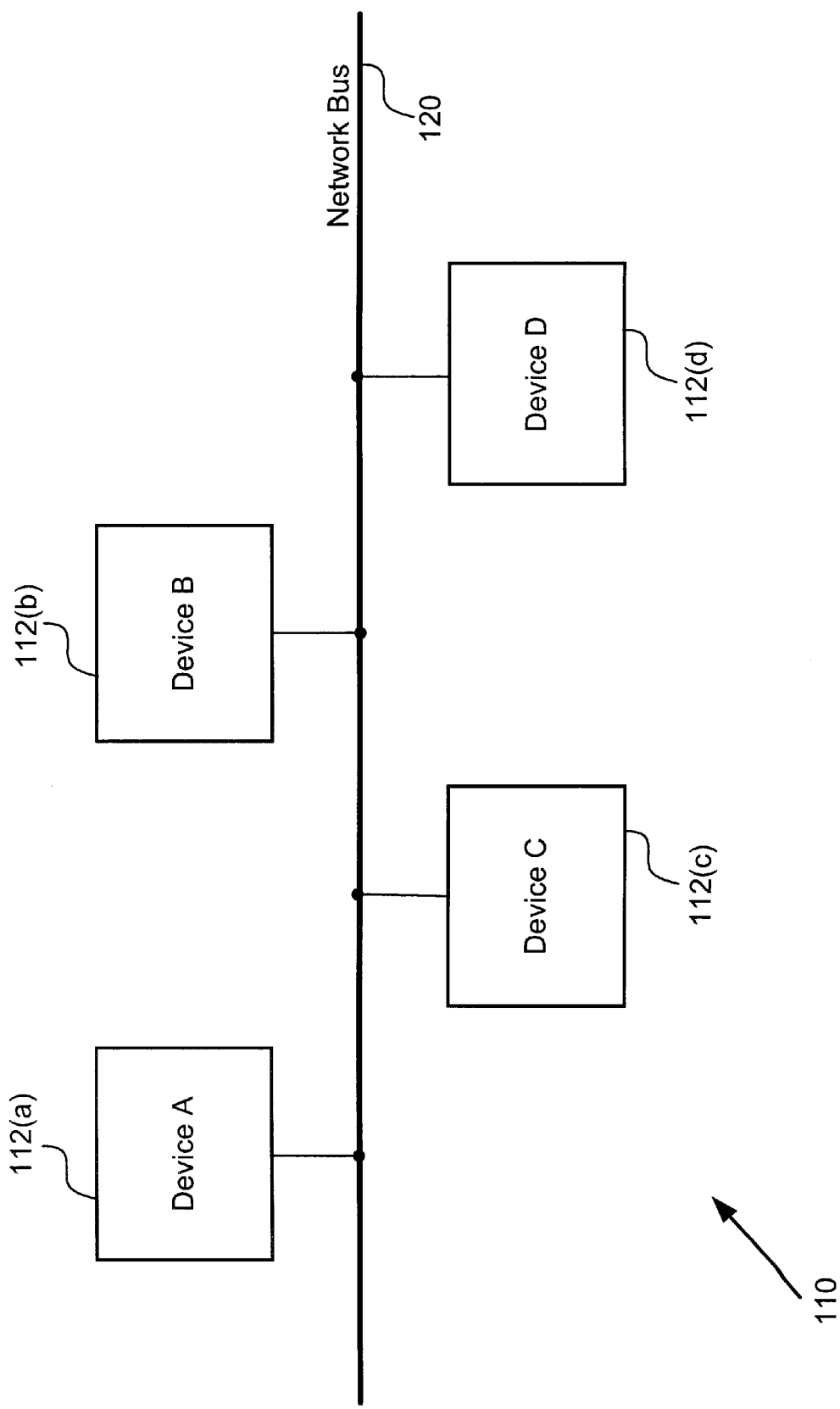
FIG. 1 is a block diagram for one embodiment of an electronic network, in accordance with the present invention.

Referring now to FIG. 1, a block diagram for one embodiment of an electronic network 110 is shown, in accordance with the present invention. In the FIG. 1 embodiment, network 110 includes, but is not limited to, device A 112(*a*), device B 112(*b*), device C 112(*c*), and device D 112(*d*). In other embodiments, network 110 may readily be implemented using a larger or smaller number of devices than the four devices (device A 112(*a*) through device D 112(*d*)) shown in the FIG. 1 embodiment.

In the FIG. 1 network 110, device A 112(*a*), device B 112(*b*), device C 112(*c*), and device D 112(*d*) preferably communicate with each other through a commonly-shared network bus 120. In the FIG. 1 embodiment, network bus 120 is preferably implemented according to a P1394 Standard for a High Performance Serial Bus, IEEE, 1995, which is hereby incorporated by reference.. However, in alternate embodiments, other appropriate and compatible interconnectivity standards are also contemplated for use in conjunction with the present invention.

In the FIG. 1 embodiment, network 110 may preferably be configured to operate in accordance with the Home Audio/Video Interoperability (HAVi) core specification (version 1.0 beta, at www.HAVi.org) which is hereby incorporated by reference. Therefore, device A 112(*a*), device B 112(*b*), device C 112(*c*), and device D 112(*d*) may be implemented as various types of consumer electronics devices, including, but not limited to, personal computers, digital video disk devices, television sets, audio reproduction systems, video tape recorders (VCRs), and set-top boxes for digital video broadcasting. However, in various alternate embodiments, network 110 may readily be implemented as any appropriate electronic network configured to permit communication between any desired types of electronic devices.

In the FIG. 1 embodiment, the various electronic devices that form part of network 110 preferably include the following four categories of electronic devices: full devices (FD), intermediate devices (ID), base devices (BD), and legacy devices (LD). The foregoing four categories of electronic devices (FD, ID, BD, and LD) are further discussed below in conjunction with FIGS. 2 and 3. In alternate embodiments of the present invention, network 110 may readily include various other categories of electronic devices in addition to, or instead of, the four categories of FD, ID, BD, and LD.

Figure 2:
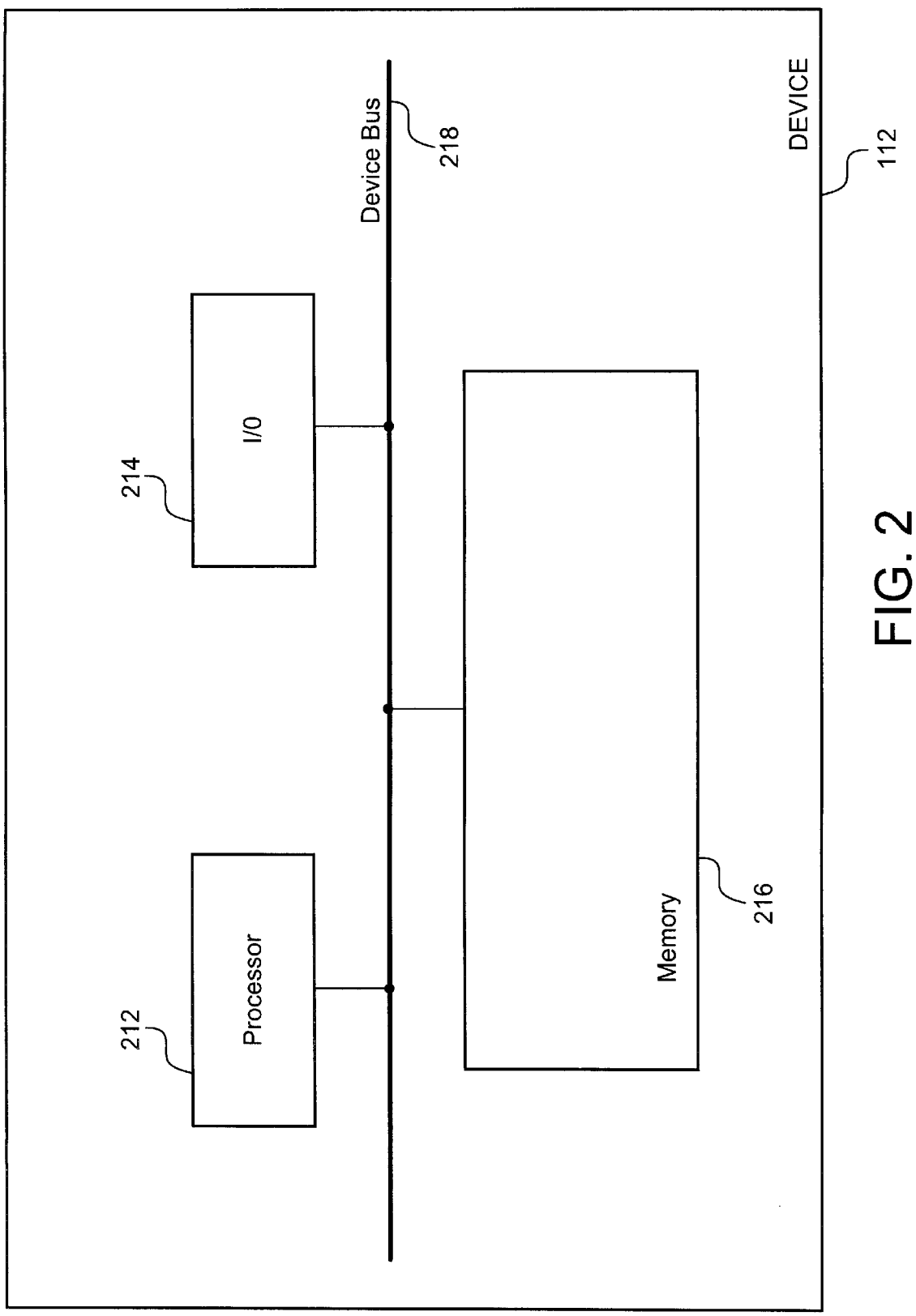
FIG. 2 is a block diagram for one embodiment of an exemplary device from FIG. 1, in accordance with the present invention.

Referring now to FIG. 2, a block diagram for one embodiment of an exemplary device 112 from FIG. 1 is shown, in accordance with the present invention. In the FIG. 2 embodiment, device 112 preferably includes, but is not limited to, a processor 212, an input/output interface (I/O) 214, and a memory 216 that are each coupled to, and communicate with each other via, a common device bus 218. In the FIG. 2 embodiment, device 112 is preferably configured to represent either a full device or an intermediate device, as referred to above in the discussion of the FIG. 1 network 110.

In the FIG. 2 embodiment, processor 212 may be implemented to include any appropriate and compatible generic, multi-purpose microprocessor device. The FIG. 2 input/output interface (I/O) 214 preferably provides an effective interface to facilitate communications between device 112 and network bus 120 (FIG. 1). In the FIG. 2 embodiment, memory 216 may be implemented to include any combination of desired storage devices, including, but not limited to, read-only memory (ROM), random-access memory (RAM), and various types of non-volatile memory, such as floppy disks or hard disks. The contents and functionality of memory 216 are further discussed below in conjunction with FIGS. 3 and 4.

Figure 3:
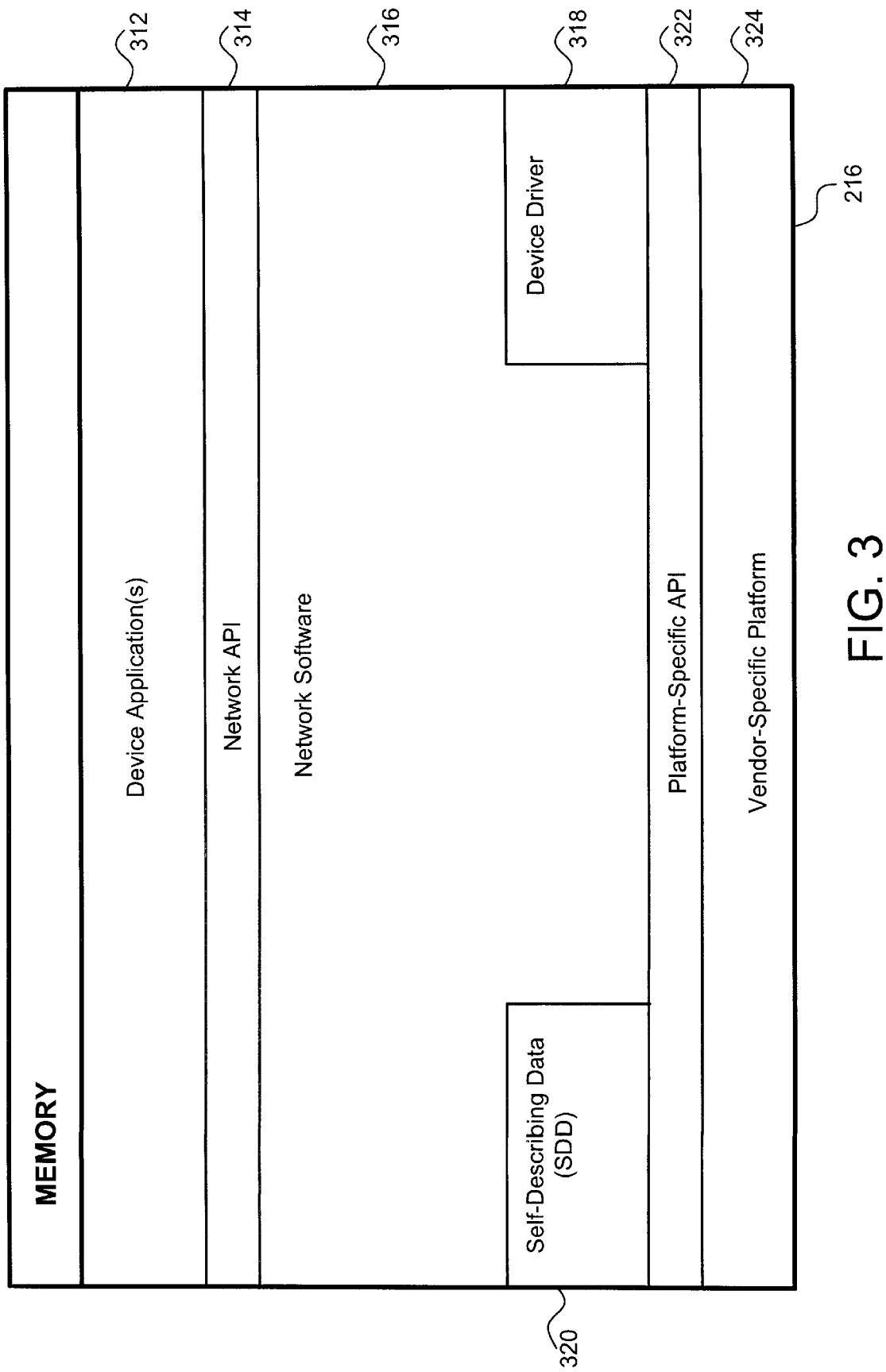
FIG. 3 is a diagram for one embodiment of the memory of FIG. 2, in accordance with the present invention.

Referring now to FIG. 3, a diagram for one embodiment of FIG. 2 memory 216 is shown, in accordance with the present invention. In the FIG. 3 embodiment, memory 216 includes one or more device applications 312, a network application program interface (API) 314, network software 316, self-describing data (SDD) 320, a device driver 318, a platform-specific application program interface (API) 322, and a vendor-specific platform 324. In alternate embodiments, memory 216 may readily include various components and elements that are different from, or in addition to, those software components 312 through 324 discussed in conjunction with the FIG. 3 embodiment.

In the FIG. 3 embodiment, device application(s) 312 preferably include software instructions that are executed by processor 212 (FIG. 2) to effectively manage and control the functionality of device 112. Network API 314 preferably serves as an interface between various elements of network software 316 and device application 312.

In the FIG. 3 embodiment, network software 316 preferably includes one or more software elements that are executed by processor 212 to advantageously permit device 112 to communicate and cooperate with other devices in network 110. The contents and functionality of network software 316 are further discussed below in conjunction with FIG. 4.

Self-describing data (SDD) 320 preferably includes various types of relevant information regarding device 112. For example, SDD 320 may include information specifying the manufacturer, model, version, serial number, and other fixed data that specifically corresponds to device 112. Device driver 318 preferably includes appropriate software instructions that permit device 112 to communicate with network bus 120 (FIG. 1).

In the FIG. 3 embodiment, platform-specific API 322 provides an interface that preferably permits network software 316 to communicate with vendor-specific platform 324. In the FIG. 3 embodiment, vendor-specific platform 324 may include basic operating system software for supporting low-level operations of device 112.

The FIG. 3 embodiment of memory 216 typically corresponds to a full device (or FD, as discussed above in conjunction with FIG. 1) that preferably includes a complete set of network software 316 to permit optimal compatibility and functionality with network 110. Alternately, memory 216 may correspond to an intermediate device (ID) which includes only a reduced set of software elements from network software 316. In contrast, a device-control module for a base device (BD) is preferably hosted on network 110 by a full device or an intermediate device, and therefore the base device typically does not include network software 316. A base device, however, preferably does include self-describing data 320 and a device driver 318.

A legacy device (LD) may be defined as a device that does not comply with the architectural specifications of network 110 and network software 316. Legacy devices typically were designed and manufactured prior to the design and implementation of network 110 and network software 316. Therefore, a legacy device is preferably hosted on network 110 by a full device or an intermediate device, and typically does not include network software 316 or self-describing data 320. A base device or a legacy device, however, may include a device driver 318 for interfacing with network bus 120. Full devices, intermediate devices, base devices, and legacy devices are further discussed in the Home Audio/Video Interoperability (HAVi) core specification (see pages 3 through 22) that has been previously incorporated by reference.

Figure 4:
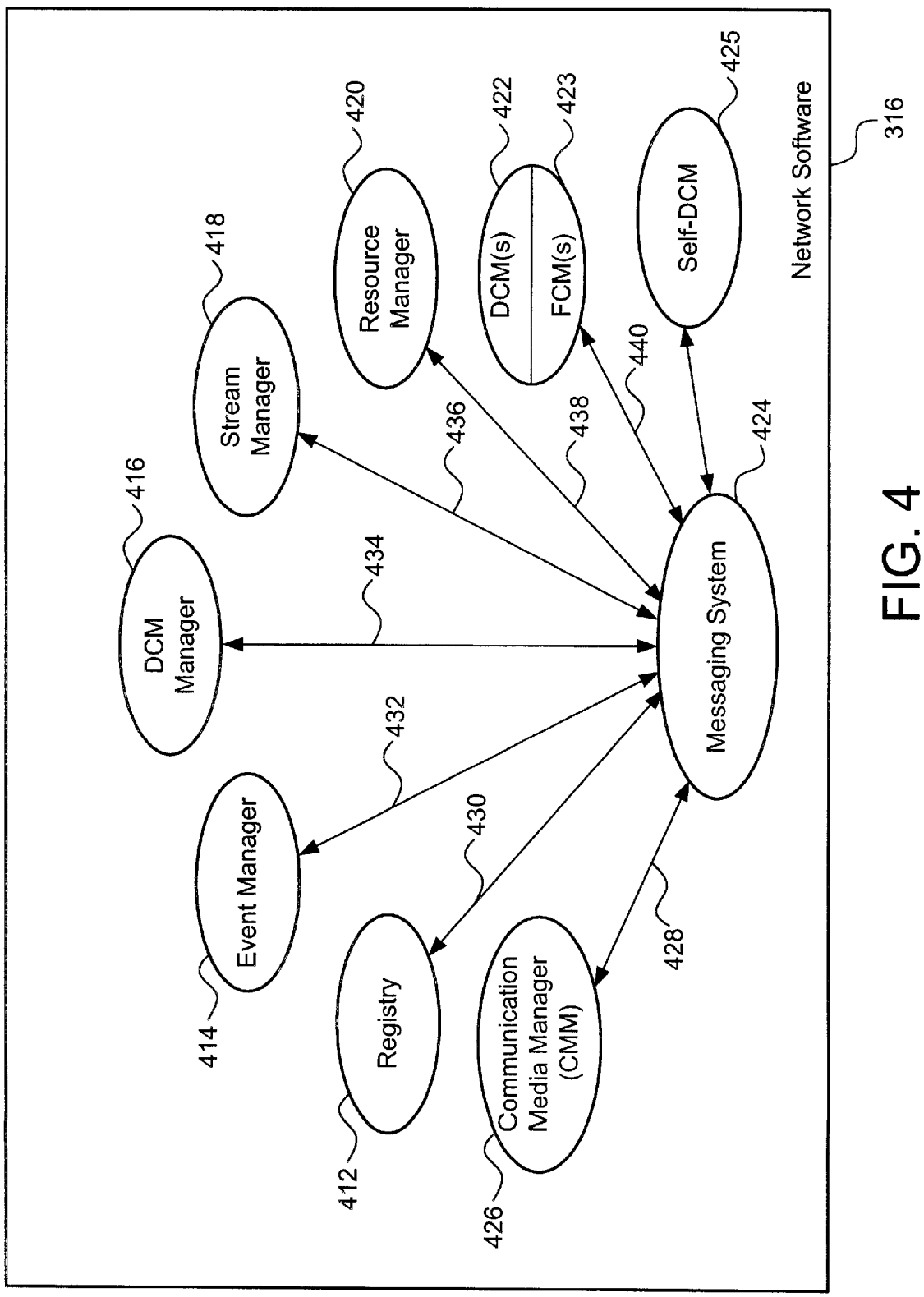
FIG. 4 is a diagram for one embodiment of the network software of FIG. 3, in accordance with the present invention.

Referring now to FIG. 4, a diagram for one embodiment of the network software 316 of FIG. 3 is shown, in accordance with the present invention. In the FIG. 4 embodiment, network software 316 preferably comprises a number of software elements, including a registry 412, an event manager 414, a device control module (DCM) manager 416, a stream manager 418, a resource manager 420, one or more device control modules (DCMs) 422 and one or more corresponding functional control modules (FCMs) 423, a messaging system 424, a communication media manager (CMM) 426, and a self-device control module (self-DCM) 425.

In the FIG. 4 embodiment, software elements 412 through 426 are preferably configured to function in accordance with the Home Audio/Video Interoperability (HAVi) architecture which has previously been incorporated herein by reference. However, in alternate embodiments, network software 316 may readily conform to any other appropriate and compatible interoperability architecture, and may also include various software elements that are different from, or in addition to, those elements 412 through 426 that are presented in the FIG. 4 embodiment.

In the FIG. 4 embodiment, registry 412 may preferably include a listing of software elements in network software 316. Registry 412 also preferably may include relevant element information or attributes corresponding to the listed software elements. For example, elements 412 through 426 from network software 316 and corresponding element information may be listed in registry 412. Registry 412 therefore may serve as a directory service for applications 312 or software elements in network 110. Registry 412 may thus allow any application or software element to obtain a software element identifier (SEID) for identifying and locating another software element in network 110. In accordance with the present invention, registry 412 may also include a remote registry list that identifies all remote registries on network 110.

In the FIG. 4 embodiment, event manager 414 preferably serves as a network-event notification service to notify various software elements (that have previously subscribed for notification) about the occurrence of a specified network event, such as a change in a software element or a change in network 110. DCM manager 416 is preferably responsible for installing and removing DCMs 422 on full devices or intermediate devices. Stream manager 418 is preferably responsible for managing real-time transfer of data and other information between various functional components of network 110.

In the FIG. 4 embodiment, resource manager 420 preferably facilitates the sharing of various resources and scheduling of various actions in network 110. A device control module (DCM) 422 preferably includes a software element that is used to control a specific associated device on network 110. A given DCM 422 preferably includes one or more directly-corresponding functional control modules (FCMs) 423 that each control a specific functional component within the particular device 112 that corresponds to the FCM 423. A full device or an intermediate device may preferably host a DCM 422 to control a remote base device or a remote legacy device on network 110. In the FIG. 4 embodiment, messaging system 424 is preferably responsible for bi-directionally transferring various messages between the software elements of network software 316. Communication media manager (CMM) 426 coordinates and manages asynchronous and isochronous communications through device driver 318 onto network bus 120.

Network software 316 preferably performs a number of significant and related operations whenever a particular device is removed from, or added to, network 110. When a device is added or removed from network 110, then network bus 120 preferably triggers a bus reset event which notifies all connected devices about the change in network 110. Following the bus reset event, all DCM managers 416 in network 110 preferably perform a negotiation procedure to determine which, if any, DCM manager 416 is the most appropriate host for controlling the newly-added device 112. Each DCM manager 416 in network 110 may therefore maintain a current list of all devices in network 110. Once a given DCM manager 416 is selected as host, that host DCM manager 416 responsively instantiates a new DCM 422 as an abstraction of the control interface of the newly-added device. Network software 316 preferably also updates relevant software element information in registry 412 whenever a device is removed from, or added to, network 110.

In accordance with the present invention, self-DCM 425 preferably includes software instructions for advantageously receiving and handling information that is transmitted from other devices on network 110 using various types of communications protocols and specifications. The configuration and utilization of self-DCM 425 is further discussed below in conjunction with FIGS. 5 through 8.

Figure 5:
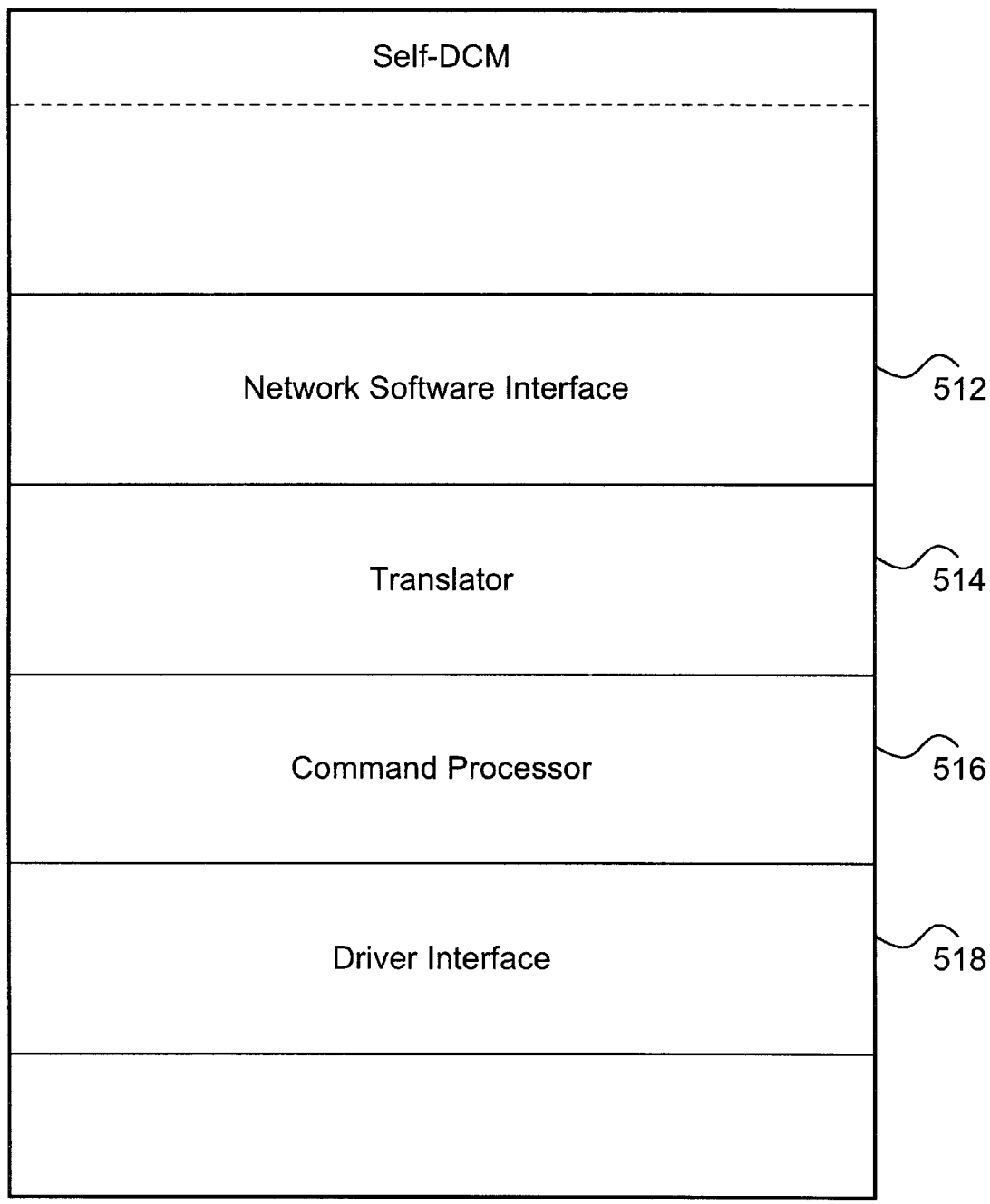
FIG. 5 is a diagram for one embodiment of the self-DCM of FIG. 4, in accordance with the present invention.

Referring now to FIG. 5, a diagram for one embodiment of the FIG. 4 self-DCM 425 is shown, in accordance with the present invention. In the FIG. 5 embodiment, self-DCM 425 includes, but is not limited to, a driver interface 518, a command processor 516, a translator 514, and a network software interface 512. In alternate embodiments, self-DCM 425 may include various elements that are different from, or in addition to, those discussed in conjunction with the FIG. 5 embodiment.

In the FIG. 5 embodiment, self-DCM 425 is preferably implemented in network software 316 of a particular local device 112 to represent and control various functions of that local device 112 on network 110. Self-DCM 425 preferably comprises an abstraction of the control interface of the local device 112 that may then be utilized to interact between various software modules and the local device 112.

In the FIG. 5 embodiment, self-DCM 425 preferably may receive information or communications that are transmitted from remote devices on network 110 using a variety of messaging protocols or specifications that are different from the messaging protocol and specifications of network software 316, and are therefore not necessarily compatible with or understood by network software 316.

In accordance with the present invention, driver interface 518 preferably functions as an effective interface between device driver 318 (FIG. 3) and self-DCM 518 to receive and handle information sent to device driver 318 from other devices via network bus 120. Command processor 516 then preferably accesses the information received by driver interface 518, and responsively utilizes a handler mechanism that determines how to successfully process or interpret the received information.

In the FIG. 5 embodiment, translator 514 preferably may then convert the received information into translated information that is configured in a network software format which is compatible with the protocol and specifications of network software 316. Finally, network software interface 512 may then provide the translated information that has been converted into the network software format to network software 316. Additional details regarding the functionality and utilization of self-DCM 425 are further discussed below in conjunction with FIGS. 6 through 8.

Figure 6:
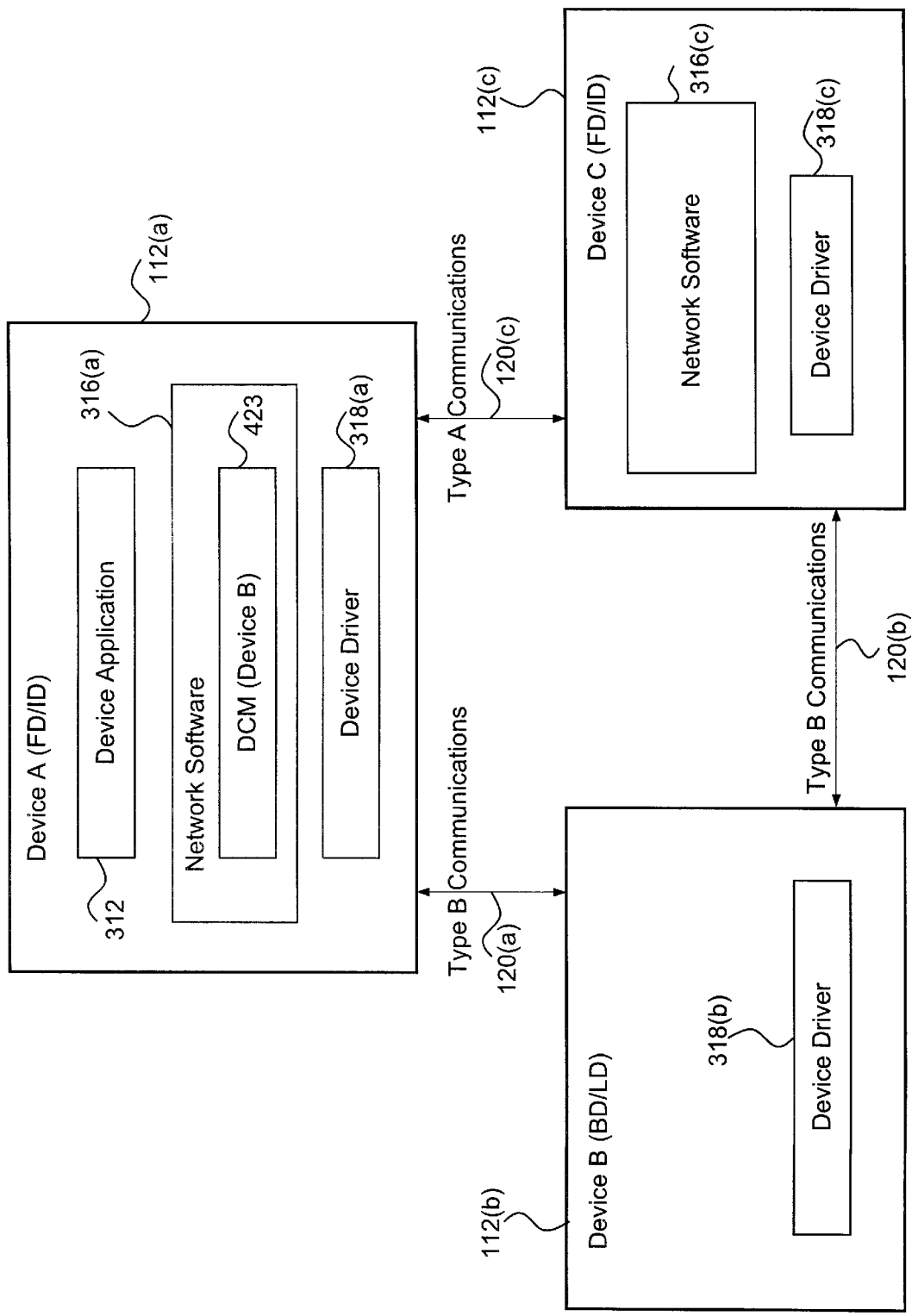
FIG. 6 is a diagram illustrating one embodiment for the utilization of network devices with multiple communication protocols.

Referring now to FIG. 6, a diagram illustrating one embodiment for the utilization of network devices 112(*a*), 112(*b*), and 112(*c*) is shown. The following discussion of the FIG. 6 embodiment is presented for purposes of illustration only, and devices 112(*a*), 112(*b*), and 112(*c*) may readily be utilized various other ways in alternate embodiments of network 110.

In the FIG. 6 embodiment, for purposes of illustration, device A (112(*a*)) and device C (112(*c*)) are preferably implemented as either full devices (FD) or intermediate devices (ID). In contrast, device B (112(*b*)) is preferably implemented as a base device (BD) or a legacy device (LD) that communicates using a different messaging protocol or specification than that utilized by device A (112(*a*)) and device C (112(*c*)). Furthermore, in the FIG. 6 embodiment, device A (112(*a*)) preferably hosts a device control module 422 for controlling and communicating with device B (112(*b*)). In one embodiment of FIG. 6, the various communications 120(*a–c*) may designate logical communications between devices of network 110, and therefore may not necessarily imply a physical connection.

In practice, device application 312 of device A (112(*a*)) may generate a type A communication to DCM 422 in network software 316(*a*) for controlling or communicating with device B 112(*b*)). In the FIG. 6 embodiment, a type A communication is preferably transmitted according to a protocol and specification that are directly compatible with network software 316. For example, in the FIG. 6 embodiment, a type A communication may conform to the HAVi specification that has previously been incorporated by reference. However, device B (112(*b*)) preferably utilizes a messaging protocol and specification that are different from the foregoing type A communications, and therefore device B (112(*b*) may not directly understand type A communications from device application 312.

Therefore, DCM 422 and device driver 318(*a*) preferably convert the type A communication into a type B communication that is transmitted to device driver 318(*b*) in device B (112(*b*)) via network bus 120(*a*). In the FIG. 6 embodiment, a type B communication is preferably transmitted according to a protocol and specification that are not directly compatible with network software 316. For example, in the FIG. 6 embodiment, a type B communication may conform to the P1394 specification that has been previously incorporated by reference. More specific examples of such P1394 protocols and specifications are discussed in "AV/C Digital Interface Command Set General Specification, Version 3.0, Apr. 15, 1998," and in "International Standard IEC 61883-1, First Edition, 1998," which are hereby incorporated by reference.

After receiving the type B communication (from DCM 422 via device driver 318(*a*), network bus 120(*a*), and device driver 318(*b*)), the device B (112(*b*)) may responsively take appropriate action, depending upon the nature of the information initially sent from device application 312.

In accordance with the present invention, device B (112(*b*)) may also transmit a type B communication from device driver 318(*b*) through network bus 120(*b*) to device driver 318(*c*) of device C (112(*c*)). In the FIG. 6 embodiment, the type B communication transmitted over network bus 120(*b*) may relate to any desired topic, including an event, state, request, command, action, or other occurrence. For example, device B (112(*b*)) may request information from device C (112(*c*)), or alternately, device B (112(*b*)) may notify device C (112(*c*)) about an occurrence on network 110, such as a change of the state of device B (112(*b*)).

In the FIG. 6 embodiment, device B (112(*b*)) may transmit type B communications to device driver 318(*c*) of device C (112(*c*)) using a Control and Status Registers (CSR)

Architecture for microcomputer buses that is discussed in detail in "International Standard ANSI/IEEE Std 1212, First Edition, 1994," which is hereby incorporated by reference. In the FIG. 6 embodiment, the CSR architecture may preferable be implemented, for example, as part of device driver 318(c) to allow other devices in network 110 to locate and communicate with device C 112(c). In alternate embodiments, devices coupled to network bus 120 may communicate in accordance with various other mechanisms and standards.

Once device driver 318(c) has received the type B communication from device B 112(b), then device C (112(c)) may potentially take action based on the nature of the type B communication. However, network software 316(c) remains unaware of the type B communication received via network bus 120(b) because network software 316(c) does not directly understand type B communications, and no mechanism exists to inform network software 316(c) about the received type B communication. Furthermore, device A (112(a)) also may have no knowledge about information that is encoded in the type B communications from device B (112(b)). The inability of network software 316 of network 110 to learn about the occurrence and significance of type B communications may significantly impair the overall efficiency and effectiveness of network messaging and communications.

Figure 7:
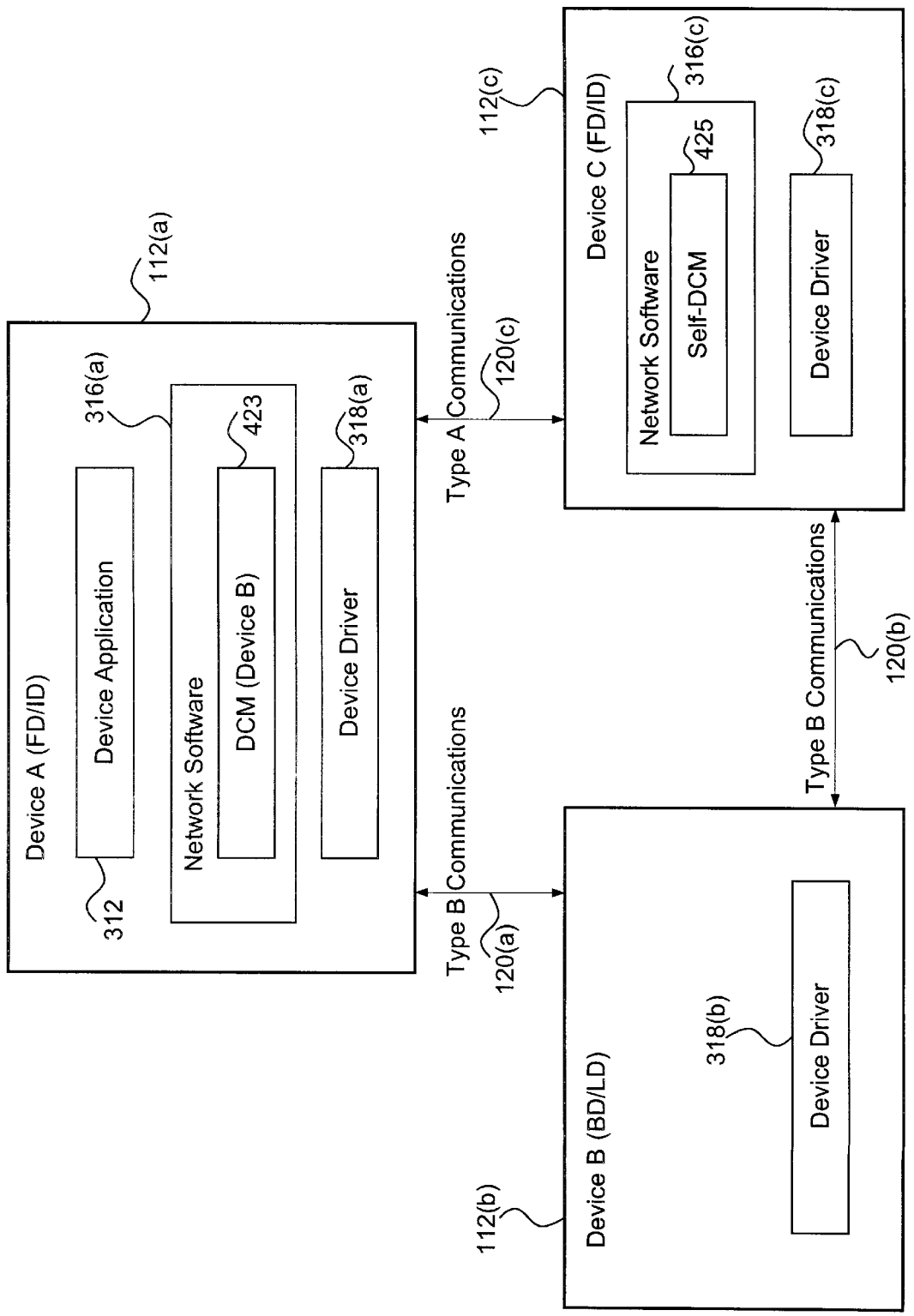
FIG. 7 is a block diagram illustrating the utilization of a self-DCM, in accordance with one embodiment of the present invention.

Referring now to FIG. 7, a block diagram illustrating the utilization of a self-DCM 425 is shown, in accordance with one embodiment of the present invention. The following discussion of the FIG. 7 embodiment is presented for purposes of illustration only, and devices 112(a), 112(b), and 112(c) may readily be utilized various other ways in alternate embodiments of network 110.

In the FIG. 7 embodiment, for purposes of illustration, device A (112(a)) and device C (112(c)) are preferably implemented as either full devices (FD) or intermediate devices (ID). In contrast, device B (112(b)) is preferably implemented as a base device (BD) or a legacy device (LD) that communicates using a different messaging protocol or specification than that utilized by device A (112(a)) and device C (112(c)). In alternate embodiments, device B (112(b)) may also be implemented as a full device (FD) or an intermediate device (ID). Furthermore, in the FIG. 7 embodiment, device A (112(a)) preferably hosts a device control module 422 for controlling and communicating with device B (112(b)). In one embodiment of FIG. 7, the various communications 120(a–c) may designate logical communications between devices of network 110, and therefore may not necessarily imply a physical connection.

In practice, device application 312 of device A (112(a)) may generate a type A communication to DCM 422 in network software 316(a) for controlling or communicating with device B 112(b)). In alternate embodiments, DCM 422 may be implemented as a FCM 423 (FIG. 4) or any other appropriate software module. In the FIG. 7 embodiment, a type A communication is preferably transmitted according to a protocol and specification that are directly compatible with network software 316. For example, in the FIG. 7 embodiment, a type A communication may conform to the HAVi specification that has previously been incorporated by reference. However, device B (112(b)) preferably utilizes a messaging protocol and specification that are different from the foregoing type A communications, and therefore device B (112(b)) may not directly understand type A communications from device application 312.

Therefore, DCM 422 and device driver 318(a) preferably convert the type A communication into a type B communication that is transmitted to device driver 318(b) in device B (112(b)) via network bus 120(a). In the FIG. 7 embodiment, a type B communication is preferably transmitted according to a protocol and specification that are not directly compatible with network software 316. For example, in the FIG. 7 embodiment, a type B communication may conform to the P1394 specification that has been previously incorporated by reference. More specific examples of such P1394 protocols and specifications are discussed in "AV/C Digital Interface Command Set General Specification, Version 3.0, Apr. 15, 1998," and in "International Standard IEC 61883-1, First Edition, 1998," which have been previously incorporated by reference.

After receiving the type B communication (from DCM 422 via device driver 318(a), network bus 120(a), and device driver 318(b)), the device B (112(b)) may responsively take appropriate action, depending upon the nature of the information initially sent from device application 312.

In accordance with the present invention, device B (112(b)) may also transmit a type B communication from device driver 318(b) through network bus 120(b) to device driver 318(c) of device C (112(c)). In the FIG. 7 embodiment, the type B communication transmitted over network bus 120(b) may relate to any desired topic, including an event, state, request, command, action, or other occurrence. For example, device B (112(b)) may request information from device C (112(c)), or alternately, device B (112(b)) may notify device C (112(c)) about an occurrence on network 110.

In the FIG. 7 embodiment, device B (112(b)) may transmit type B communications to device driver 318(c) of device C (112(c)) using a Control and Status Registers (CSR) Architecture for microcomputer buses that is discussed in detail in "International Standard ANSI/IEEE Std 1212, First Edition, 1994," which has been previously incorporated by reference. In the FIG. 7 embodiment, the CSR architecture may preferable be implemented, for example, as part of device driver 318(c) to allow other devices in network 110 to locate and communicate with device C 112(c). In alternate embodiments, devices coupled to network bus 120 may communicate in accordance with various other mechanisms and standards.

Once device driver 318(c) has received the type B communication from device B 112(b), then device C (112(c)) may potentially take action based on the nature of the type B communication. In addition, in accordance with the present invention, a self-DCM 425 in network software (316(c) may advantageously utilize driver interface 518 (FIG. 5) to communicate with device driver 318(c) to thereby gain access to the type B communications provided via network bus 120(b). In the FIG. 7 embodiment, driver interface 518 of self-DCM 425 preferably incorporates the CSR architecture of device driver 318(c) to facilitate communications with other devices on network 110.

As discussed above, in conjunction with FIG. 5, once driver interface 518 has accessed the received type B communication, then command processor 516 may readily process the type B communication. Translator 514 may then access and translate the type B communication into a type A communication that is compatible with, and understood by, network software 316(c). Finally, network software interface 512 may provide the translated type A communication to network software 316(c) using any effective technique or methodology. Network software 316(c) may thus efficiently receive prompt notification concerning the receipt of the type B communication by device driver 318(c), and also determine the specific substance of the type B communication. In alternate embodiments, self-DCM 425 may readily utilize any other appropriate means to provide the type B communication to network software 316(*c*) in a format that is understood by network software 316(*c*).

In accordance with the present invention, self-DCM 425 may also disseminate the translated type A communication across network 110 to other remote devices that include compatible remote sets of network software 316. In general, self-DCM 425 may use network software interface 512 to directly provide the translated type A communication to other type A devices. For example, in the FIG. 7 embodiment, self-DCM 425 of device C (112(*c*)) may provide the translated type A communication to network software 316(*a*) of device A (112(*a*)) via network bus 120(*c*). Alternately, network software 316(*c*) may determine that broadcasting the translated type A communication is not appropriate in certain instances, and may respond to device B (112(*b*)) using a type B communication.

In one embodiment of the present invention, self-DCM 425 may post the translated type A communication to event manager 414 (FIG. 4) of network software 316(*c*) as a network event. Various interested software modules and devices across network 110 may subscribe for notification from event manager 414 whenever a particular network event occurs. Therefore, when self-DCM 425 posts the translated type A communication to event manager 414 as a network event, then an event manager 414 may promptly transmit the translated type A communication to all interested subscribers as a notification. In this manner, the information in the translated type A communication may become known to any set of network software 316 across network 110. One mechanism for utilizing event manager 414 to propagate notifications of network events is further discussed in co-pending U.S. patent application Ser. No. 09/257,344, entitled "System And Method For Implementing Active Registries In An Electronic Network," filed on Feb. 25, 1999, which has previously been incorporated herein by reference.

Referring again to FIG. 6, in certain circumstances, a source network device may utilize a resource manager 420 (FIG. 4) to reserve a target network device for performing a specific scheduled action. For example, in the FIG. 6 embodiment, device A (112(*a*)) may use a type A communication to reserve device C (112(*c*)) for automatically performing a scheduled action at a specified time.

If device B (112(*b*)) sends a conflicting type B communication to device C (112(*c*)) for requesting device C (112(*c*)) to perform a conflicting action, then, the conflicting type B communication may disadvantageously override the previously-scheduled reservation made by device A (112(*a*). It should be noted that the FIG. 6 network software 316(*c*) lacks a self-DCM 425, and therefore network software 316 on network 110 may be unaware of the conflicting type B communication and the danger of overriding the previously-scheduled reservation made by device A (112(*a*)).

In contrast, in the FIG. 7 embodiment, network software 316(*c*) includes a self-DCM 425 that may advantageously inform network software 316 on network 110 that device B (112(*b*)) has sent a conflicting type B communication to device C (112(*c*)). In response, resource manager 420 may efficiently arbitrate and resolve the conflict between the previously-scheduled reservation from device A (112(*a*)) and the conflicting type B communication from device B (112 (*b*)). In accordance with the present invention, resource manager 420 may utilize any appropriate methodologies for resolving the foregoing conflict.

In some embodiments of the present invention, self-DCM 425 may advantageously be utilized to avoid various other potential conflicts or problems in addition to the foregoing conflict between a scheduled reservation and a conflicting communication. For example, in response to a given type B communication, self-DCM 425 may instigate an analysis of various states or conditions in network 110 to thereby regulate the response to the type B communication by devices in network 110.

In the FIG. 7 embodiment, self-DCM 425 is implemented as part of network software 316(*c*) of device C (112(*c*)). However, in various alternate embodiments, self-DCM 425 may readily be implemented in any suitable location(s) on any of one or more network devices across network 110.

Figure 8:
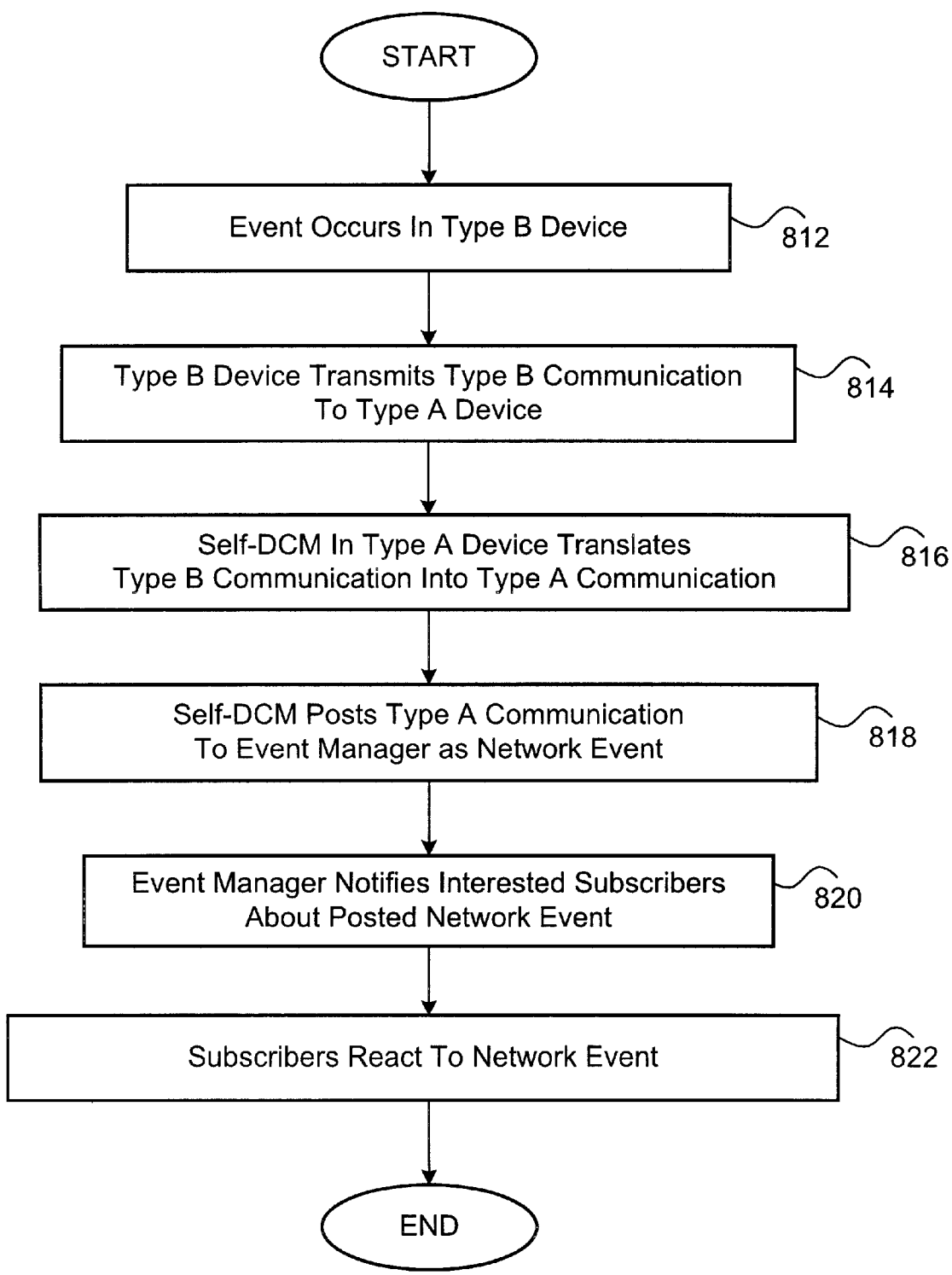
FIG. 8 is a flowchart of method steps for utilizing a self-DCM, in accordance with one embodiment of the present invention.

Referring now to FIG. 8, a flowchart of method steps for utilizing a self-DCM 425 is shown, in accordance with one embodiment of the present invention. The following method steps of the FIG. 8 embodiment illustrate an exemplary use of self-DCM 425. However, in alternate embodiments, self-DCM 425 may readily function and be utilized in a variety of other effective and advantageous ways.

In the FIG. 8 embodiment, initially, in step 812, a particular event occurs in a type B device 112(*b*) on network 110. In the FIG. 8 embodiment, the foregoing event may preferably include an occurrence of any relevant type or description. In step 814, in response to the step 812 event, the type B device 112(*b*) preferably transmits a type B communication to a type A device 112(*c*) on network 110. The type B communication transmitted in step 814 preferably relates in some manner to the event that occurred in step 812.

In step 816, a self-DCM 425 in network software 316(*c*) of the type A device 112(*c*) preferably accesses the received type B communication transmitted in step 814, and then advantageously translates the type B communication into a type A communication that is compatible with, and may be understood by, network software 316(*c*) of the type A device 112(*c*).

In step 818, the self-DCM 425 preferably posts the translated type A communication of step 816 to an event manager 414 in network software 316(*c*) of the type A device 112(*c*). The self-DCM 425 preferably posts the translated type A communications as a network event. Then, in step 820, the event manager 414 preferably notifies any interested devices or software modules that have subscribed for notification regarding this particular network event. In the FIG. 8 embodiment, various remote versions of network software 316 residing on respective remote devices preferably subscribe for notification whenever self-DCM 425 receives a type B communication.

Finally, in step 822, the subscribers may react to the notification from event manager 414 in any appropriate manner, depending upon the type of event and the type of subscribing device or software module. The FIG. 8 embodiment is discussed in the context of a single self-DCM 425. However, the present invention is equally contemplated for use with multiple self-DCMs residing on respective network devices 112 across network 110.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims

What is claimed is:

1. A system for efficiently implementing an electronic network, comprising:
   a first device coupled to said electronic network for transmitting an event communication according to a first communications protocol; and
   a self-DCM coupled to said electronic network for converting said event communication into a translated communication that utilizes a second communications protocol which is compatible with a second device on said electronic network.

2. The system of claim 1 wherein said event communication and said first communications protocol are implemented according to an IEEE P1394 interconnectivity specification.

3. The system of claim 1 wherein said event communication and said first communications protocol are implemented according to an AV/C digital interface command set specification.

4. The system of claim 1 wherein said first device is implemented as one of a base and a legacy device that are compatible with said first communications protocol.

5. The system of claim 1 wherein said translated communication and said second communications protocol are compatible with network software implemented according to a home audio/visual interoperability specification.

6. The system of claim 1 wherein said second device is implemented as one of a full device and an intermediate device that are compatible with said second communications protocol.

7. The system of claim 1 wherein said self-DCM is implemented as part of network software on said second device, said network software being compatible with said second communications protocol.

8. The system of claim 1 wherein said first device transmits said event communication to said second device, said event communication including information relating to an occurrence on said first device.

9. The system of claim 8 wherein said event communication is received and handled by a device driver corresponding to said second device.

10. The system of claim 9 wherein said device driver handles said event communication in accordance with a control and status registers (CSR) architecture.

11. The system of claim 9 wherein said self-DCM accesses said event communication from said device driver, and responsively processes and converts said event communication into said translated communication.

12. The system of claim 11 wherein a driver interface in said self-DCM communicates with said device driver to access said event communication.

13. The system of claim 12 wherein a command processor in said self-DCM accesses said event communication from said driver interface, and responsively utilizes a handler to determine how to process and respond to said event communication.

14. The system of claim 13 wherein a translator accesses said event communication from said command processor, and responsively converts said event communication into said translated communication.

15. The system of claim 14 wherein a network software interface provides said translated communication to network software on said second device.

16. The system of claim 1 wherein said self-DCM posts said translated communication to an event manager in a local set of network software on said second device.

17. The system of claim 16 wherein said event manager propagates a notification regarding said translated communication to subscribed remote sets of network software across said electronic network.

18. The system of claim 1 further comprising a third device coupled to said electronic network, said third device using a resource manager in network software to create a reservation for said second device to perform a scheduled action.

19. The system of claim 18 wherein said event communication from said first device creates a conflict with said reservation made by said third device.

20. The system of claim 19 wherein said self-DCM provides said translated communication to said resource manager which responsively arbitrates and resolves said conflict.

21. A method for efficiently implementing an electronic network, comprising the steps of:
   transmitting an event communication from a first device on said electronic network according to a first communications protocol; and
   utilizing a self-DCM to convert said event communication into a translated communication that utilizes a second communications protocol which is compatible with a second device on said electronic network.

22. The method of claim 21 wherein said event communication and said first communications protocol are implemented according to an IEEE P1394 interconnectivity specification.

23. The method of claim 21 wherein said event communication and said first communications protocol are implemented according to an AV/C digital interface command set specification.

24. The method of claim 21 wherein said first device is implemented as one of a base and a legacy device that are compatible with said first communications protocol.

25. The method of claim 21 wherein said translated communication and said second communications protocol are compatible with network software implemented according to a home audio/visual interoperability specification.

26. The method of claim 21 wherein said second device is implemented as one of a full device and an intermediate device that are compatible with said second communications protocol.

27. The method of claim 21 wherein said self-DCM is implemented as part of network software on said second device, said network software being compatible with said second communications protocol.

28. The method of claim 21 wherein said first device transmits said event communication to said second device, said event communication including information relating to an occurrence on said first device.

29. The method of claim 28 wherein said event communication is received and handled by a device driver corresponding to said second device.

30. The method of claim 29 wherein said device driver handles said event communication in accordance with a control and status registers (CSR) architecture.

31. The method of claim 29 wherein said self-DCM accesses said event communication from said device driver, and responsively processes and converts said event communication into said translated communication.

32. The method of claim 31 wherein a driver interface in said self-DCM communicates with said device driver to access said event communication.

33. The method of claim 32 wherein a command processor in said self-DCM accesses said event communication from said driver interface, and responsively utilizes a handler to determine how to process and respond to said event communication.

34. The method of claim 33 wherein a translator accesses said event communication from said command processor, and responsively converts said event communication into said translated communication.

35. The method of claim 34 wherein a network software interface provides said translated communication to network software on said second device.

36. The method of claim 21 wherein said self-DCM posts said translated communication to an event manager in a local set of network software on said second device.

37. The method of claim 36 wherein said event manager propagates a notification regarding said translated communication to subscribed remote sets of network software across said electronic network.

38. The method of claim 21 further comprising a third device coupled to said electronic network, said third device using a resource manager in network software to create a reservation for said second device to perform a scheduled action.

39. The method of claim 38 wherein said event communication from said first device creates a conflict with said reservation made by said third device.

40. The method of claim 21 wherein said first device is implemented as one of a base, a legacy device, an intermediate device, and a full device that are compatible with said first communications protocol.

41. A system for efficiently implementing an electronic network, comprising:

means for transmitting an event communication over said electronic network according to a first communications protocol; and means for converting said event communication into a translated communication that utilizes a second communications protocol which is compatible with a target device on said electronic network.

42. A computer-readable medium comprising program instructions for efficiently implementing an electronic network by performing the steps of:

transmitting an event communication from a first device on said electronic network according to a first communications protocol; and utilizing a self-DCM to convert said event communication into a translated communication that utilizes a second communications protocol which is compatible with a second device on said electronic network.

* * * * *